United States Patent

Banjo

[11] Patent Number: 5,930,737
[45] Date of Patent: Jul. 27, 1999

[54] MEASUREMENT SYSTEM USING DOUBLE CPU MODULES FOR HUMAN MACHINE INTERFACE CONTROL AND MEASUREMENT MODULE CONTROL

[75] Inventor: Nobukazu Banjo, Tokyo, Japan

[73] Assignee: Ando Electric Co., Ltd., Tokyo, Japan

[21] Appl. No.: 08/994,166

[22] Filed: Dec. 19, 1997

[30] Foreign Application Priority Data

Dec. 26, 1996 [JP] Japan ................................. 8-349102

[51] Int. Cl.⁶ ................................................. G06F 13/00
[52] U.S. Cl. ......................... 702/127; 702/62; 702/182; 364/132
[58] Field of Search ............................. 702/57, 62, 127, 702/182, 186; 364/130, 131, 132; 395/200.3, 200.38, 200.39, 200.57, 200.79, 200.83

[56] References Cited

U.S. PATENT DOCUMENTS

| | | | |
|---|---|---|---|
| 4,467,412 | 8/1984 | Hoff | 364/132 |
| 4,907,146 | 3/1990 | Caporali | 364/132 |
| 5,265,201 | 11/1993 | Cabot et al. | 364/132 |
| 5,289,582 | 2/1994 | Hirata et al. | 395/849 |
| 5,386,494 | 1/1995 | White | 704/275 |
| 5,550,965 | 8/1996 | Gabbe et al. | 345/302 |

*Primary Examiner*—John Barlow
*Assistant Examiner*—Bryan Bui
*Attorney, Agent, or Firm*—Fish & Richardson P.C.

[57] ABSTRACT

A measurement system analyzes and displays measurement data obtained from measurement modules with respect to prescribed measured values. A large scale graphical user interface (GUI) is provided as a human-machine interface and functions as a display as well as a data input device. The measurement system employs double CPU modules for sharing loads of data processing required for the GUI and measurement modules, respectively. A first CPU module controls the human-machine interface and performs data processing. A second CPU module controls the measurement modules. The first CPU module uses a firsts system for communications, whereas the second CPU module uses a second bus system for communications with the measurement modules. A bus exchanger connects the first and second bus systems so that a user of the system can control the measurement system using the GUI while providing real-time performance for the measurement modules.

5 Claims, 4 Drawing Sheets

MEASUREMENT SYSTEM USING DOUBLE CPU MODULES FOR HUMAN MACHINE INTERFACE CONTROL AND MEASUREMENT MODULE CONTROL

BACKGROUND OF THE INVENTION

This invention relates to measurement systems which control measurement devices to enable data processing for measurement in real time. This application is based on patent application No. Hei 8-349102 filed in Japan, the content of which is incorporated herein by reference.

FIG. 3 is a block diagram showing an example of a measurement system. Herein, a block 13 corresponds to a CPU module 13 which performs a variety of processes and controls while a block 14 corresponds to measurement modules that perform measurement with respect to certain measured values. The CPU module 13 and measurement modules 14 are connected together by a bus system 15. In addition, a block 16 corresponds to human-machine interface functions (abbreviated by "HMI"). The CPU module 13 is configured by a measurement module control block 17, a data processing block 18 and a HMI control block 19. The measurement module control block 17 controls the measurement modules 14; the data processing block 18 performs analytical processing of measurement data; and HMI control block 19 controls human-machine interface factors such as the display that are being actualized by the HMI block 16.

Next, a description will be given with respect to operation of the measurement system of FIG. 3 in conjunction with FIG. 4.

The HMI block 16 is actualized by a display device, a data input device and the like, which are used to enter input measurement parameters. Such input measurement parameters input by the HMI block 16 are supplied to the HMI control block 19. So, the HMI control block 19 analyzes the input measurement parameters. Based on results of analysis, the HMI control block 19 accesses the measurement module control block 17 to set certain measurement parameters for the measurement modules 14 (see step C1).

Next, the HMI block 16 issues a measurement start instruction. So, the measurement module control block 17 controls the measurement modules 14 to start measurement in accordance with the measurement parameters (see step C2).

When a condition is satisfied so that measurement data can be read, the measurement modules 14 output signals to the measurement module control block 17 (see step C3). So, the measurement module control block 17 reads the measurement data from the measurement modules 14, so that the measurement data are supplied to the data processing block 18 (see step C4).

Then, the data processing block 18 analyzes the measurement data, so that results of analysis are supplied to the HMI control block 19 (see step C5). The HMI control block 19 processes the results of analysis to match with forms suited to the functions of the HMI block 16. So, the results of analysis are supplied to the HMI block 16 (see step C6). Then, program control passes to the measurement module control block 17.

If the present situation meets a measurement completion condition, the measurement module control block 17 declares a completion of the measurement. If not, the measurement module control block 17 waits for a moment when the measurement modules 14 are ready to read data (see a flow of steps C7 and C3). If it becomes possible to read data from the measurement modules 14, the aforementioned steps are repeated so that measurement data are read and are subjected to analysis. The steps C3 to C7 are repeated until the measurement completion condition is satisfied.

Currently the measurement modules are capable of setting multiple measurement parameters in response to a variety of measurement functions. In addition, an amount of information contained in measurement data is increased in response to high performance which is required for the measurement modules. For this reason, a problem arises because the character-base HMI using the character user interface (abbreviated by "CUI") cannot display all pieces of information corresponding to the measurement data efficiently.

To solve the above problem, it is necessary to construct the architecture of the graphical user interface (abbreviated by "GUI") as the HMI. However, the foregoing measurement system is designed to perform control of the HMI using a single CPU module. So, if the HMI such as the GUI having a large scale in software is constructed, the CPU module 13 should require much processing time for the control of the HMI. Further, in order to analyze the measurement data whose amount is increased due to the high performance of the measurement modules, it is necessary to increase a load to the data processing block 18 in the CPU module 13.

In general, the measurement parameters input by the HMI 16 contain measurement timing to perform measurement, so it is necessary to perform processing of the measurement module control block 17 first. However, to engage construction of the GUI and to perform processing of a large amount of data, the CPU module 13 requires a large part of the processing time thereof for the HMI control block 19 and the data processing block 18. So, in some cases, a time delay may occur in control of the measurement modules 14 by the measurement module control block 17. A problem arises because a single CPU module cannot respond to the demand of the measurement modules in real time.

Recently, there is a great demand that multiple different measurement modules are used in an organic manner to perform measurement in a consecutive manner. However, not all the measurement modules used for the measurement are capable of coping with the same bus system. In addition, the foregoing measurement system cannot cope with bus systems other than the bus system which is controlled by the CPU of the CPU module thereof. For this reason, another problem arises because multiple measurement systems are required to perform measurement using the multiple different measurement modules.

SUMMARY OF THE INVENTION

It is an object of the invention to provide a measurement system which can meet real-time performance requested by measurement modules.

It is another object of the invention to provide a measurement system which has a high degree of generalization as well as a capability to cope with different bus systems.

The measurement system of this invention is provided to perform analysis and display of measurement data representing results of measurement which is performed using measurement modules with respect to prescribed measured values. A large scale graphical user interface (GUI) is constructed for a human-machine interface which provides a display as well as a data input.

Now, the measurement system of this invention is characterized by employing double CPU modules for sharing loads of the data processing required for the GUI and measurement modules respectively. Herein, a first CPU module is exclusively provided for controlling the human-machine interface and for performing data processing such as analysis of the measurement data while a second CPU module is used for controlling the measurement modules to obtain the measurement data. The first CPU module uses a first bus system for communications while the second CPU module uses a second bus system for communications with respect to the measurement modules. A bus exchanger provides connections between the first and second bus systems. Thus, a user is capable of controlling the measurement system using the GUI while providing real-time performance for the measurement modules.

BRIEF DESCRIPTION OF THE DRAWINGS

These and other objects of the subject invention will become more fully apparent as the following description is read in light of the attached drawings wherein.

DESCRIPTION OF THE PREFERRED EMBODIMENT

Figure 1:
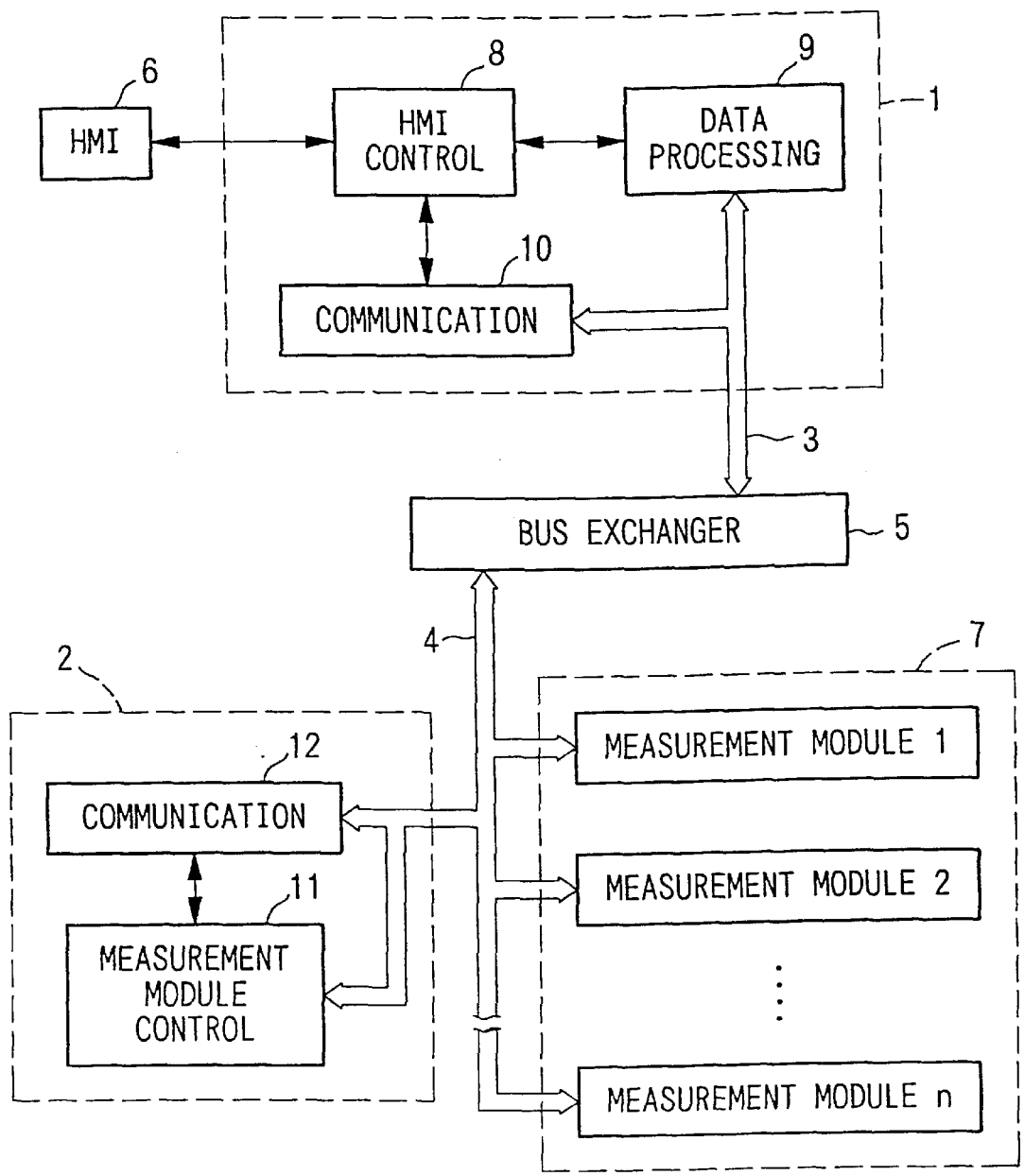
FIG. 1 is a block diagram showing a configuration of a measurement system in accordance with an embodiment of the invention.

FIG. 1 is a block diagram showing a configuration of a measurement system in accordance with an embodiment of the invention. Herein, blocks 1 and 2 correspond to CPU modules respectively while a block 5 corresponds to a bus exchanger which is capable of providing connections using a same bus system or different bus systems. The CPU module 1 uses a bus system 3 while the CPU module 2 uses a bus system 4. The bus systems 3 and 4 are connected to the bus exchanger 5. In addition, a block 6 corresponds to a human-machine interface (i.e., HMI) containing a display device, a data-input device and the like while a block 7 corresponds to measurement modules. Further, the CPU module 1 is configured by a HMI control block 8 for controlling the display and the like, a data processing block 9 for performing analytical processing on measurement data, and a communication block 10 for controlling communications with another CPU module. Furthermore, the CPU module 2 is configured by a measurement module control block 11 for controlling the measurement modules 7 and a communication block 12 for controlling communications with another CPU module.

Next, a description will be given with respect to operation of the measurement system of FIG. 1 in conjunction with FIGS. 2A and 2B.

Figure 2A:
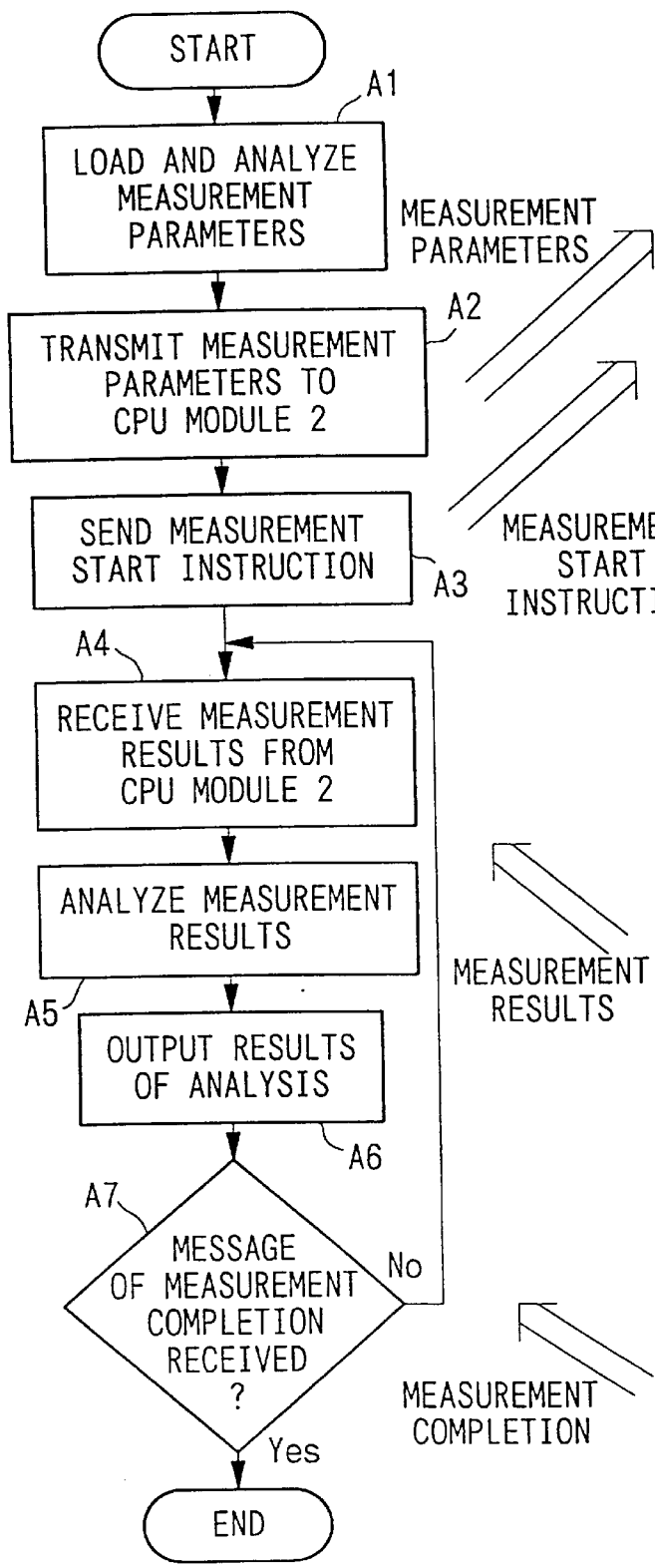
FIGS. 2A and 2B are flowcharts showing steps respectively executed by CPU modules contained in the measurement system of FIG. 1.
Figure 2B:
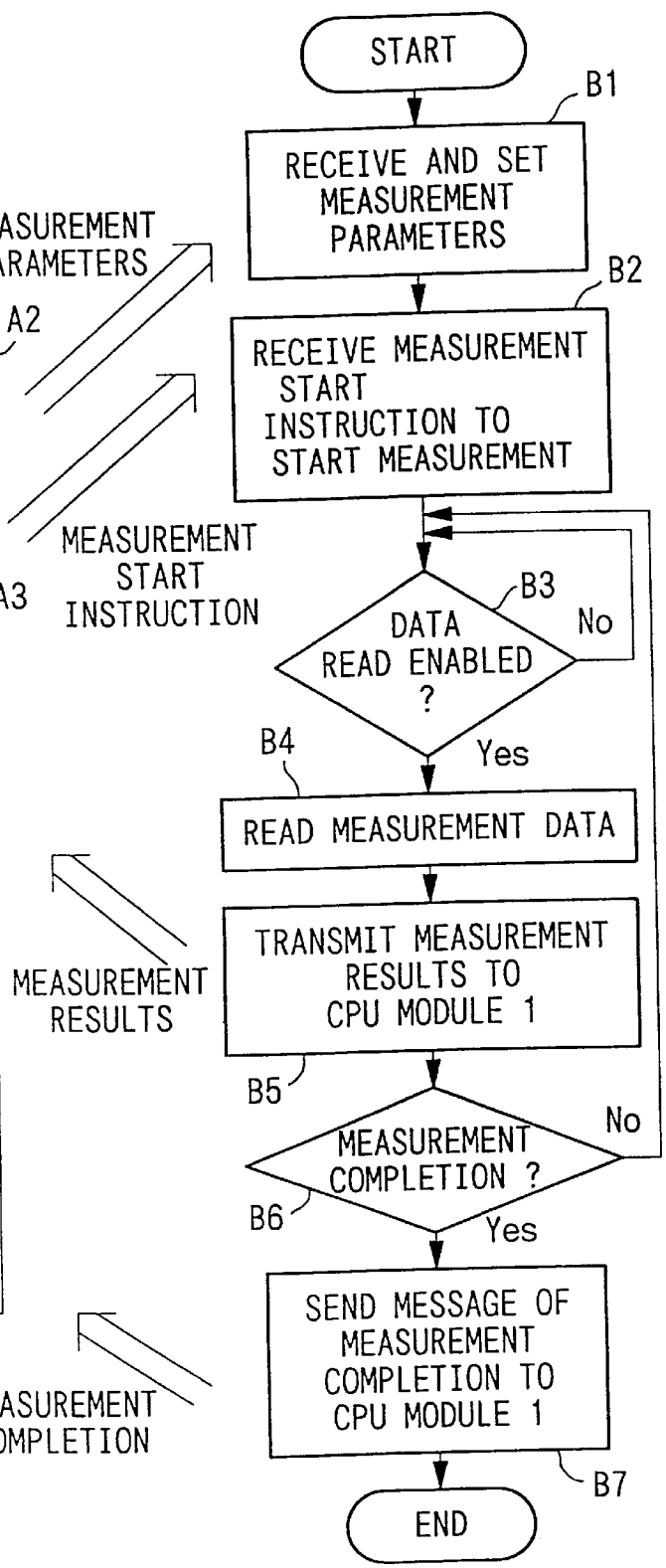
Figure 3:
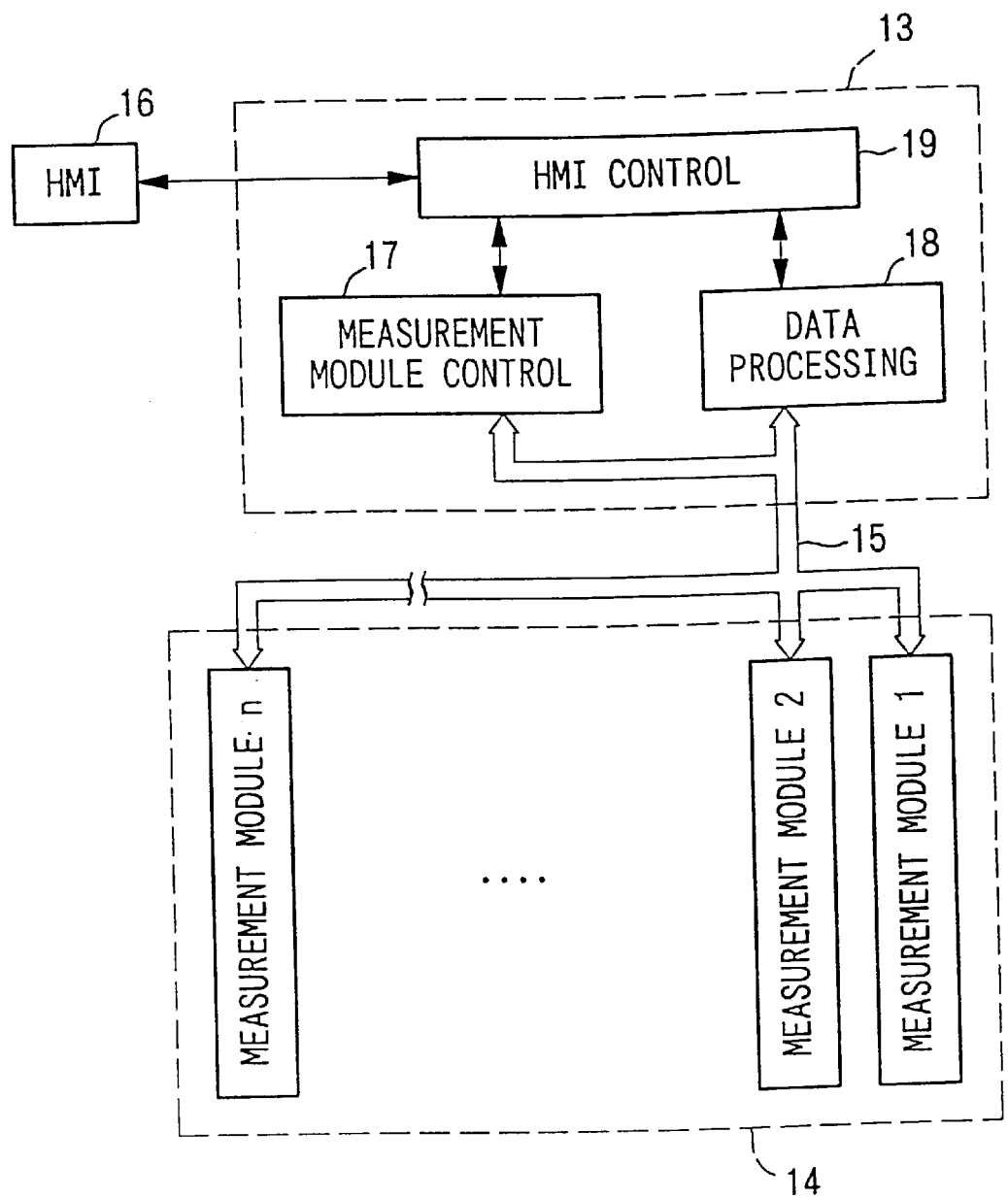
FIG. 3 is a block diagram showing an example of a measurement system.
Figure 4:
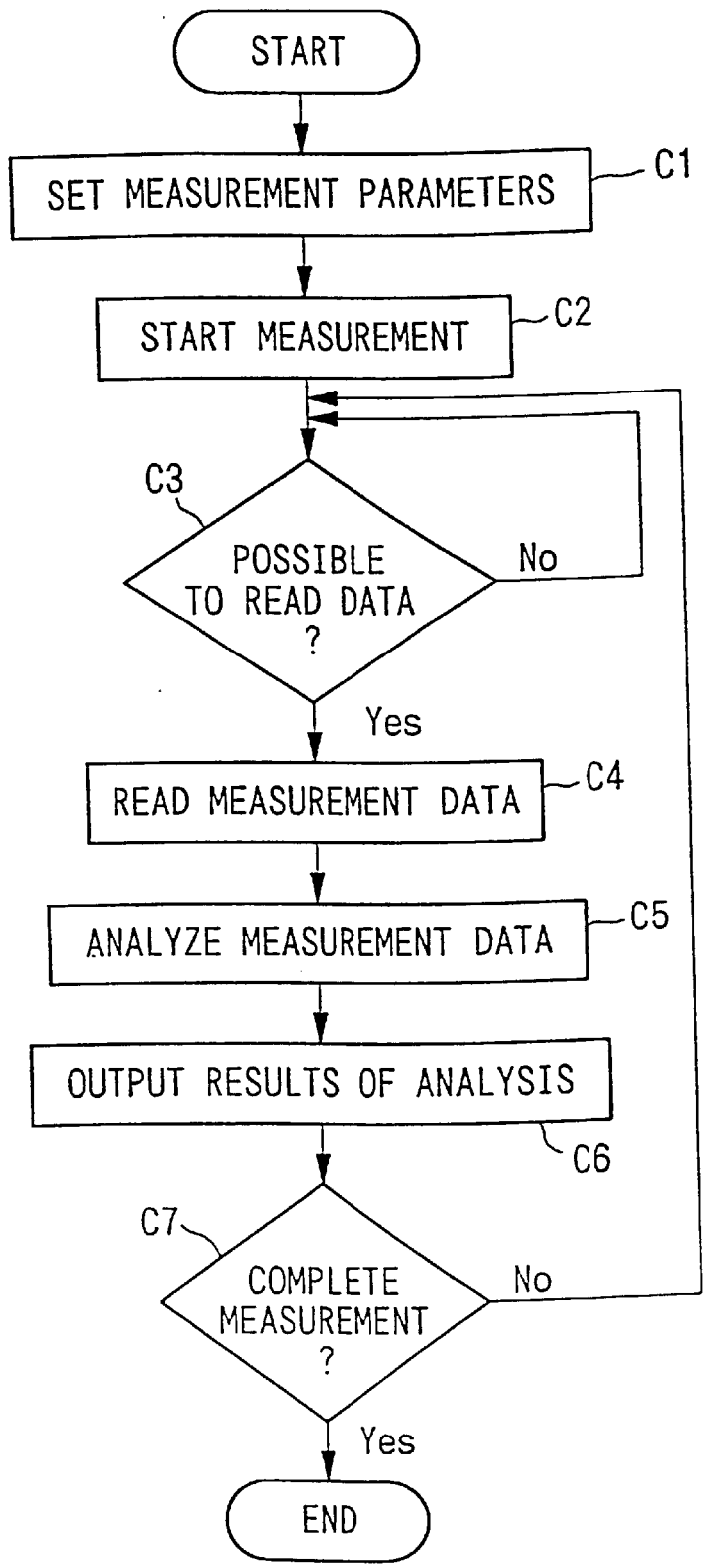
FIG. 4 is a flowchart showing operation of the measurement system of FIG. 3.

FIG. 2A is a flowchart showing a flow of steps executed by the CPU module 1 while FIG. 2B is a flowchart showing a flow of steps executed by the CPU module 2. Arrows (→) drawn between the flowcharts of FIGS. 2A and 2B show directions of communications between steps of the CPU modules. In order to simplify relationships of communications between the CPU modules via the bus exchanger 5, an explanation of the operation of the measurement system is made by describing the operation of both CPU modules together.

In the flowchart of the CPU module 1 shown in FIG. 2A, the HMI control block 8 loads and analyzes measurement parameters input by the HMI 6 (see step A1). Herein, the measurement parameters correspond to measurement conditions such as the measurement time and a number of times to perform measurement. In the analysis of the measurement parameters, the CPU module 1 checks whether the input parameters belong to an effective range of measurement or not.

Then, using the communication block 10, the CPU module 1 transmits of the measurement parameter, analyzed by the HMI control block 8, toward the CPU module 2 (see step A2).

The bus exchanger 5 is designed to recognize the CPU module 2 connected thereto as a functional module which is controlled by the CPU of the CPU module 1. That is, the communication block 10 performs control (i.e., communication) on the CPU module 2 connected to the bus exchanger 5 as the functional module controlled by the CPU of the CPU module 1. In other words, the communication block 10 performs a write operation to write data into the CPU module 2 which the bus exchanger 5 recognizes as the functional module. Thus, it is possible to transmits of data with respect to the CPU module 2. The communication block 10 periodically determines whether or not data exist in the CPU module 2 which is recognized as the functional block. If the data exist in the CPU module 2, the communication block 10 loads the data from the CPU module 2. Or, the communication block 10 loads the data from the CPU module 2 under a condition to receive an interrupt instruction from the CPU module 2. Thus, it is possible to receive data from the CPU module 2. Similar operations of the communication block 10 described above are employed by the communication block 12 of the CPU module 2. Thus, it is possible to realize communications between the CPU modules 1 and 2.

Next, in the flowchart of FIG. 2B (see step Bl), the CPU module 2 receives the measurement parameters of the CPU module 1, which are transmitted thereto via the bus exchanger 5, by means of the communication block 12. Then, the CPU module 2 uses the measurement module control block 11 to set the measurement parameters to the measurement modules 7.

In the flowchart of FIG. 2A (see step A3), a measurement start instruction is supplied by the HMI 6. The measurement start instruction is supplied to the HMI control block 8, so that the CPU module 1 uses the communication block 10 to transmit the measurement start instruction to the CPU module 2.

In the flowchart of FIG. 2B (see step B2), the CPU module 2 receives the measurement start instruction which is transmitted thereto via the bus exchanger 5. Herein, the measurement start instruction is received by the communication block 12. Under control of the measurement module control block 11, the CPU module 2 starts measurement of the measurement modules 7 in accordance with the measurement parameters which are set in the step B1.

When a condition is satisfied that the measurement modules 7 are ready to read measurement data corresponding to results of the measurement which is started in the step B2, the measurement modules 7 provide a read enable signal to the measurement module control block 11. So, the measurement module control block 11 confirms the read enable signal from the measurement modules 7 (see step B3), so that the CPU module 2 proceeds to a next step (i.e., step B4).

In a read enable state in which measurement data can be read from the measurement modules 7, the measurement module control block 11 accesses the measurement modules 7 to read the measurement data (see step B4). Then, the CPU module 2 uses the communication block 12 to transmit the measurement data to the CPU module 1 (see step B5).

Then, the CPU module 2 proceeds to step B6. If the present situation meets a measurement completion condition which is set in the aforementioned step B1, the measurement module control block 11 declares completion of the measurement. If not, the CPU module 2 proceeds back to step B3 so as to wait for another read enable condition that new measurement data can be read from the measurement modules 7. When it comes to the read enable condition that the new measurement data can be read from the measurement modules 7, the CPU module 2 reads the new measurement data (see step B4). Then, the aforementioned steps are repeated. Such a repetition of the steps is continuously made until the measurement completion condition is satisfied.

When the measurement is completed, the CPU module 2 uses the communication block 12 to transmit a message of "measurement completion" to the CPU module 1 (see step B7). Thus, the CPU module 2 ends the processing thereof.

In the flowchart of FIG. 2A (see step A4), the CPU module 1 uses the communication block 10 to receive measurement results (i.e., measurement data) which are transmitted thereto from the CPU module 2 in the aforementioned step B5.

In step A5, the CPU module 1 uses the data processing block 9 to analyze the measurement data. Thus final result are obtained. For example, the data processing block 9 calculates values and deviations with respect to the measurement data.

Then, results of the analysis made by the data processing block 9 are sent to the HMI control block 8 wherein they are processed to match with the prescribed forms suited to the display. So, an output of the HMI control block is forwarded to the HMI 6 (see step A6). The prescribed forms suited to the display employed by the HMI control block 8 correspond to visual forms by which a human operator of the measurement can understand the measurement results with ease. For example, the display provides visual representation of the average values and the like as well as a graph showing time-series variations of the measurement data.

After completion of the outputting of the analysis results (see step A6), the CPU module 1 proceeds to step A7 to make a decision whether to receive a message of "measurement completion". If the CPU module 1 does not receive such a message, the CPU module 1 proceeds back to step A4, so it is placed in a standby state to wait for a time to receive next measurement data. Then, the steps A4 to A6 are repeated until the CPU module 1 receives the message of "measurement completion" from the CPU module 2. When receiving the message, the CPU module 1 completes the processing thereof.

As described heretofore, the present embodiment is designed to share processes (or loads) between multiple CPU modules. Thus, it is possible to provide additional processing capability of the CPU. This enables construction of a large scale GUI as well as analysis of a large number of measurement data while satisfying the real-time performance which the measurement modules request.

The foregoing embodiment merely provides an example of the measurement system which connects two CPU modules to the bus exchanger. The forgoing embodiment can be modified to cope with a situation where the measurement modules each respond to different bus systems. Namely, in order to enable a single HMI to set different parameters with respect to the measurement modules in the above situation, it is possible to provide connections between the bus exchanger and a number of CPU modules each having a specific bus system to control each of the measurement modules, for example.

In addition, the present embodiment is designed such that the CPU module 1 uses the bus system 3 while the CPU module 2 uses the bus system 4. In any event, the design of the measurement system is made based on the requirement that the CPU module 2 has the bus system which responds to the measurement modules. That is, it is possible to employ the same bus system for the bus systems 3 and 4 which the CPU modules 1 and 2 use respectively.

As this invention may be embodied in several forms without departing from the spirit of essential characteristics thereof, the present embodiment is therefore illustrative and not restrictive, and the scope of the invention is defined by the appended claims rather than by the description preceding them, and all changes that fall within metes and bounds of the claims, or equivalence of such metes and bounds are therefore intended to be embraced by the claims.

What is claimed is:

1. A measurement system for real-time data processing comprising:

a first CPU module which contains a human-machine interface control means, a data processing means and a first communication means;

a first bus system being controlled by the first CPU module;

a second CPU module which contains a measurement module control means and a second communication means;

a second bus system being controlled by the second CPU module; and a bus exchanger for providing connections between the first bus system and the second bus system, wherein communications of data between the first communication means of the first CPU module and the second communication means of the second CPU module is performed by the bus exchanger.

2. A measurement system for real-time data processing comprising:

a first CPU module which contains a human-machine interface control means, a data processing means and a first communication means;

a first bus system being controlled by the first CPU module;

a second CPU module which contains a measurement module control means and a second communication means;

a second bus system being controlled by the second CPU module; and a bus exchanger for providing connections between the first bus system and the second bus system, wherein communications of data is performed between the first communication means of the first CPU module and the second communication means of the second CPU module by means of the bus exchanger, and wherein the first CPU module, the human-machine interface control means performs control of display and analysis of measurement parameters input thereto; the processing means performs an analytical process on measurement data which are obtained by a measurement module; and the first communication means performs control of communications with respect to the second CPU module, whereas in the second CPU module, the measurement module control means performs control of the measurement module; and the second communication means performs control of the measurement module; and the second communication means performs control of communications with respect to the first CPU module.

3. A measurement system for real-time data processing comprising:

a human-machine interface;

a first CPU module exclusively provided for controlling the human-machine interface and for performing data processing;

a second CPU module used for controlling at least one measurement module to obtain measurement data representing a result of measurement with respect to a prescribed measured value; and first communication means for performing communications between the first CPU module and the second CPU module and second communication for performing communications between the second CPU module and the measurement module.

4. A measurement system for real-time data processing as defined in claim 3 wherein the first communication means includes a bus exchanger for providing connections between a first bus system coupled to the first CPU module and a second bus system for providing connections between the second CPU module and the measurement module.

5. A measurement system for real-time data processing as defined in claim 3 wherein the human-machine interface employs a graphical user interface.

* * * * *